United States Patent [19]

Bloxsom et al.

[11] Patent Number: 5,235,787
[45] Date of Patent: Aug. 17, 1993

[54] METHOD OF CONSTRUCTING HEXAGONAL STRUCTURES

[76] Inventors: Daniel E. Bloxsom, P.O. Box 630036, Houston, Tex. 77263-0036; Joseph T. Bloxsom, P.O. Box 630026, Houston, Tex. 77263-0026

[21] Appl. No.: 911,459

[22] Filed: Jul. 10, 1992

[51] Int. Cl.[5] .......................... E04H 1/00; E04B 1/19
[52] U.S. Cl. ...................... 52/79.3; 52/79.4; 52/236.1
[58] Field of Search .................. 52/79.3, 236.1, 236.4, 52/745

[56] References Cited

U.S. PATENT DOCUMENTS

| | | | |
|---|---|---|---|
| 2,745,520 | 5/1956 | Boutard | 52/236.1 |
| 3,226,889 | 1/1966 | Debes | 52/73 |
| 4,045,937 | 9/1977 | Stucky | 52/79.1 |
| 4,633,641 | 1/1987 | Heinbuchner | 52/79.1 |
| 4,672,779 | 6/1987 | Boyd | 52/79.4 |

*Primary Examiner*—Henry E. Raduazo
*Assistant Examiner*—Christopher T. Kent
*Attorney, Agent, or Firm*—William E. Shull; Marcella D. Watkins

[57] ABSTRACT

The present invention comprises a method and apparatus for constructing hexagonal structures. In forming a right hexagonal prism structure, three rectangular sections are constructed, each having two parallel end pieces of a preselected height and width, and having a length equal to the width of the end pieces times the square root of three. The sections are stacked and nested such that the edges of their end pieces touch the edges of adjacent end pieces, resulting in the rectangular sections being rotated 60° with respect to one another around an axis. Adjacent end pieces are then connected together, with the six end pieces defining the sides of a right hexagonal prism. In forming a hexagonal surface structure, three rectangular units are constructed, each having two parallel end members of a preselected width, and having a length equal to the width of the end members times the square root of three. The units are stacked and nested in a manner similar to that for the right hexagonal prism structures. Adjacent end members are then connected together, with the six end members defining the sides of a substantially planar hexagon.

16 Claims, 2 Drawing Sheets 5,235,787

METHOD OF CONSTRUCTING HEXAGONAL STRUCTURES

BACKGROUND OF THE INVENTION

Hexagonal structures are known in the art and are often desired as units of construction. They have been found useful, for example, in architecture as elements of homes, schools, commercial establishments, or other public structures. Hexagonal structures may be particularly practical in outer space for uses such as in space stations or the like, because they contain more space per unit of wall area than rectangular structures and because they are easily grouped, honeycomb fashion, into larger structures which are also surface-efficient.

The assembly of adjacent components having the obtuse angles required in the construction of hexagonal structures, however, is relatively difficult, as compared to the construction of the right angles in more common rectangular structures. It is an object of this invention to provide a hexagonal structure which is assembled from rectangular sections, thereby avoiding the problem of assembling members having non-right angles.

SUMMARY OF THE INVENTION

The present invention discloses a method for constructing hexagonal structures which is simple and effective and uses only easily obtainable building materials. According to the invention, three substantially identical rectangular sections are constructed and then stacked and locked together to create a hexagon. The rectangular sections each comprise a pair of end pieces connected by rods and are designed so that when three sections are stacked and connected the six end pieces form a hexagonal structure and the rods of each section avoid interference with the rods of the other sections. In one preferred embodiment of the invention, the rectangular sections are connected together with connecting members external to the hexagonal structure. In an alternative embodiment of the invention, the rectangular sections are connected together with connecting members internal to the hexagon structure.

BRIEF DESCRIPTION OF THE DRAWINGS

For a further understanding of the nature and objects of the present invention, reference should be made to the following detailed description, taken in conjunction with the accompanying drawings, in which like parts are given like reference numerals and wherein.

DETAILED DESCRIPTION OF THE PREFERRED EMBODIMENTS OF THE INVENTION

Figure 1:
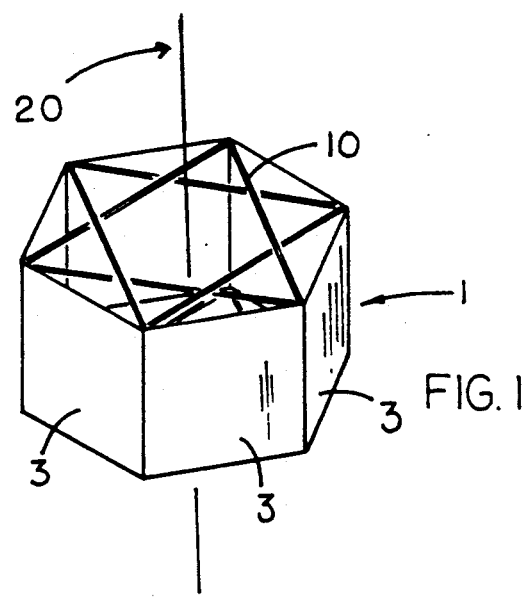
FIG. 1 is a pictorial view of a hexagonal structure constructed according to the present invention.
Figure 2:
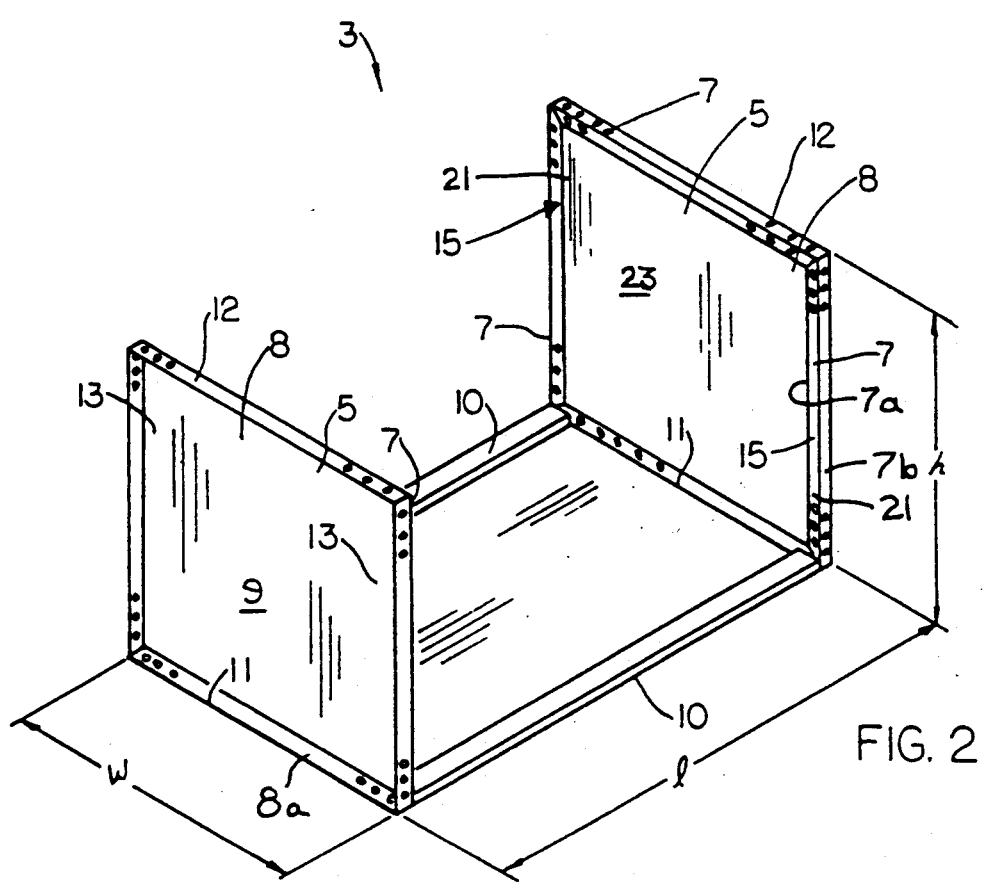
FIG. 2 is an isometric view which shows one form of a single rectangular section of the hexagonal structure of the invention, this particular form having the rods substantially flush with the lower faces of the end pieces.
Figure 3:
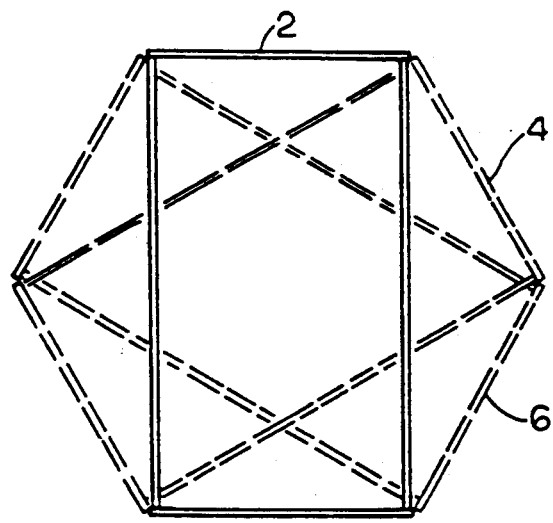
FIG. 3 is a schematic illustration showing the construction of a hexagonal structure from three rectangular sections.

The present invention discloses a method for constructing a hexagonal structure that avoids measuring or constructing any but right angles. According to the present invention, a right hexagonal prism, such as the hexagonal structure 1 shown in FIG. 1, can be achieved by stacking or nesting three substantially identical rectangular sections 3, like that shown in FIG. 2, such that the side edges of each end member abut the side edges of adjacent end members, resulting in the rotation of each section 60° with respect to the other two sections around a longitudinal axis 20. In FIG. 3, a hexagon formed from three such rectangular sections is shown, with one section 2 shown in unbroken lines and the other two sections 4 and 6 shown in phantom. Because each section is rectangular, it can be easily assembled from conventional construction materials. Although the rectangular sections 3 are illustrated as having a height h, thus forming simultaneously two hexagonal faces of the right hexagonal prism of the present structure when three sections 3 are assembled together (thereby separating the two parallel, hexagonal faces by a distance h), a single such hexagonal "face" or surface may be constructed using three rectangular units, each unit having a pair of end or cross members 8a of width w and a pair of side members or rods 10 of length l. That is, such a unit would not have an appreciable height, other than the height of the end member or cross member itself, except that sufficient height must be provided in the cross member itself to accommodate the staggering of the rods 10 as described further below. Otherwise, that is, without such staggering, three such units could not be properly stacked or nested to connect together the adjacent cross members to lock in the respective angles between them.

According to the preferred mode of carrying out the invention, right hexagonal prism structures are assembled in two steps. The first step comprises construction of three nestable rectangular sections. As used herein, the term "rectangular section" will refer to apparatus such as shown in FIG. 2, to be used in assembling a right hexagonal prism structure; the term "rectangular unit" will refer to the apparatus for forming a single hexagonal "face" as discussed at the end of the previous paragraph.

Construction of Nestable Rectangular Sections

Turning again to FIG. 2, one such rectangular section 3 is shown, having a length l, width w, and height h. The section 3 shown in FIG. 2 is preferably constructed by the connection of two parallel end pieces 8 by two rods 10. Rods 10 may be attached to the inner side edges 7a or the outer side edges 7b, which are preferably parallel to rods 10, of a frame 7 comprised in end pieces 8, or to opposed facing surfaces 15 of the end pieces 8, which may be surfaces of the frame 7, a panel 5 installed in the frame 7, or a panel 5 without a frame 7, and which are preferably perpendicular to the rods 10. Although only two such rods 10 are shown in FIG. 2, an additional pair of rods 10 may be installed near the tops of end pieces 8 when three such rectangular sections are assembled together to form a hexagonal structure, as described further below. Also as described further below, when the hexagonal structure is so assembled and the three rectangular sections 3 are locked together, the rods 10 may be removed, if desired. End pieces 8 each comprise a rectangular, substantially planar member having a width w and a height h. The planar member may comprise a rectangular frame 7 only, a rectangular frame 7 fitted with a rectangular panel 5, or a rectangular panel 5 only. FIG. 2 shows end pieces 8 in a preferred embodiment, wherein end pieces 8 each comprise a rectangular frame 7 fitted with a rectangular panel member 5. Frame 7 may be constructed of any suitable material, such as wood, metal, plastics materials, or the like, so long as it is sufficiently strong and rigid to support the structure and provides a means for attaching adjacent frame members. A material such as 90° slotted angle iron may be found convenient to use, 15 because the slots facilitate ready interconnection of the members comprised in the hexagonal structures of the present invention. In another embodiment, a hollow beam member can be used to form each side of frame 7. Such a hollow beam may be constructed by aligning two lengths of 90° angle iron so that the legs of the angle iron form the sides of a rectangle, and then joining the two lengths along the two seams so formed. Any other appropriate framing material may also be used in place of angle iron.

It is critical to operability of the invention that the ratio of the total length l of the rectangular section 3 (or the rectangular units, as the case may be) to the width w of end pieces 8 be equal to the square root of three $\sqrt{3}$). Height h of end pieces 8 defines the final depth of the right hexagonal prism structures, and may be of any desired dimension.

Each rectangular section 3 has connecting means connected to either side edges 13 of outer surface 9 or side edges 21 of inner surface 23 of end pieces 8, which are either internal connecting means or external connecting means, as described below and shown in FIGS. 4 and 5. The connecting means are attached along the length of side edges 13 or side edges 21, and are preferably attached to the end pieces 8 before construction of the rectangular sections. In a preferred embodiment the connecting means are strips of angle iron having one flange affixed to the end piece 8 and a second flange extending at an angle with respect to the first flange, either away from or toward the axis 20 of hexagonal structure 1.

Rectangular panel member 5 can comprise any suitable material, with the selection of materials influenced by the intended application of the hexagonal structures. If the structures are to be used in space, for example, tough light-weight metals such as titanium may be desired, while applications on earth may call for wood, metal, or even fabric panel members.

When three rectangular sections described above, each having its length equal to $\sqrt{3}$ times its width, are nested with their corners adjoined, the six end pieces 8 will define the sides of a right hexagonal prism. In order to assemble the three rectangular sections into a right hexagonal prism, however, it is necessary to construct each section so that its rods 10 avoid interference with the rods 10 of the other two sections when the sections are nested. A solution is to vary the distance from lower edges 11 of ends 8 at which rods 10 are placed. For example, if rods 10 are one inch high, rods 10 may be flush with lower edge 11 in one section, as shown in FIG. 2; about one inch from lower edge 11 in a second section; and about two inches from lower edge 11 in the third section. When the three sections so constructed are stacked, their six lower edges 11 define a single plane and each pair of rods 10 clears the other pairs of rods. After nesting is complete, additional rods 10 may be similarly staggered and connected between the respective end pieces 8 near their upper edges 12 (see FIG. 1) or at any other desired position on end pieces 8.

One alternative to the method of assembling the components described above, is to construct a pair of hexagonal faces or surfaces, each comprising three rectangular units as referred to above, each such rectangular unit again having length l and width w. One such hexagonal face may then be disposed at a distance h from the other, with their respective sides parallel to one another, and the two faces may then be interconnected to form the right hexagonal prism structure of the invention.

Construction of Hexagonal Structures from Rectangular Sections

The second step in the construction of the right hexagonal prism structures of the present invention comprises connecting adjacent end pieces 8 and locking the six joint angles that are defined by the planes of adjacent end pieces, creating a rigid right hexagonal prism structure and enabling rods 10 to be removed, if desired, so as to leave a clear space within the hexagonal prism structure. The joint angles may be locked by either an internal or an external method.

Figure 4:
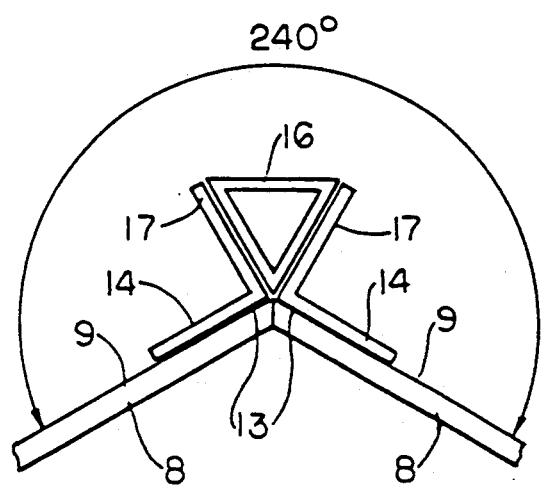
FIG. 4 is a detailed view of one preferred method of connecting the rectangular sections together.

Referring now to FIG. 4, an external method for locking the joint angles is shown. In the external method, a strip of 90° angle iron 14 is attached to each side edge 13 of outer surface 9, as shown, or to each side edge 21 of inner surface 23 of end pieces 8, preferably before the rectangular sections are nested. When the rectangular sections are nested, flanges 17 of strips 14 extend away from the axis 20 of the hexagonal prism structure 1, and the 60° angle that remains between two external flanges 17 of adjacent strips 14 is locked by mounting a reinforcing strip 16 between the flanges. A preferred embodiment is shown in the drawings wherein the reinforcing strip 16 has a triangular cross-section, and preferably that of an equilateral triangle. If the angle iron 14 is uniform, then the two flanges 17 will have the same length, and a reinforcing strip comprising an equilateral triangle having sides equal to this length will fit in the space between the flanges and the outermost leg or plane of this reinforcing strip will lie substantially flush with the outer edges of the flanges 17. The strips of angle iron 14 and the reinforcing strip 16 may be attached to the end pieces 8 and to each other by any appropriate fastening means that is known in the art, such as screws, rivets, welding, or bolts, with the method depending of course on the materials used.

Figure 5:
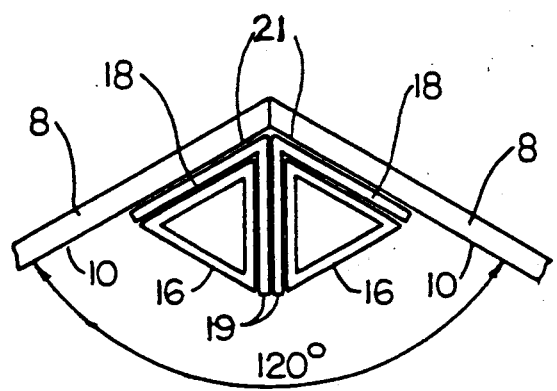
FIG. 5 is a detailed view of an alternative method of connecting the rectangular sections together.

Alternatively, adjacent rectangular sections 3 may be connected together by locking the internal 120° angle rather than the external 240° angle, a preferred method of which is shown in FIG. 5. In the internal method, strips 18, which preferably comprise strips of 60° angle iron, are attached to each side edge 21 of inner surface 23 or to each side edge 13 of outer surface 9 of end pieces 8, preferably before the rectangular sections are nested. When the rectangular sections are nested, the flanges 19 of 60° angle iron strips 18 abut one another and may be easily joined by any appropriate means, thereby locking the internal 120° angle. If desired, the 60° space of each angle iron strip 18 may be filled with a triangular reinforcing strip 16, again preferably having an equilateral triangular cross-section, as shown. Strips 16 assist in locking the two 60° angles of the angle iron strips 18, which together form the 120° internal angle required in the right hexagonal prism structure. As another alternative construction, a single bent member having a 120° internal angle may be affixed to the adjacent end members 8, instead of two 60° angle iron strips 18. In that event, a second member or reinforcing strip may be affixed between the ends of the legs of the 120° member, thereby forming a single isosceles triangle-shaped connecting and reinforcing strip instead of the two equilateral triangle-shaped reinforcing strips 16 particularly shown in the drawings.

In addition, it may further be desired to provide a roof and a floor for the right hexagonal prism structure. The hexagonal faces or openings defined by the upper and lower edges of the six end pieces 8 may be closed in any suitable manner, including but not limited to, the connection of one side of a triangular section to each upper edge 12 of the end pieces 8 such that the six triangular sections come together at a point; or replacing those triangular sections with trapezoidal sections, so that the top of the roof is truncated; or simply closing the opening with a flat member.

Coupling Multiple Hexagonal Structures

It is further possible to construct a multi-celled structure comprising several hexagonal structures coupled together. If the hexagonal structures have been constructed using the external method of locking the joint angles, external flanges 17 of angle iron 14 of adjacent hexagonal structures may be connected together. In such a case, a space will be formed between adjacent coupled structures equal to the height or depth of flanges 17 on angle iron 14. If the hexagonal structures have been constructed using the internal method of locking the joint angles, then the parallel end pieces 8 of adjacent hexagonal structures may simply be connected together. In either case, any suitable connecting means such as nuts and bolts, screws, rivets, welding, or the like may be used to connect the hexagonal structures together.

Although the embodiments of the structure described in detail herein have been found to be most satisfactory and preferred, different applications and many variations in the elements and their structure may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

For example, the concept of using rectangular sections to construct a right polygonal prism may also be used to construct structures other than hexagonal structures. One such structure is a octagonal structure, which may be constructed with four nested rectangular sections whose length is $(1+\sqrt{2})$ times their width. When nested together and locked, e.g., with appropriate angle iron strips and reinforcing strips (external construction would use, for example 90° angle iron leaving 45° between flanges 17 for placement of a triangular reinforcing strip; internal construction would use, for example, 67.5° angle iron), the 135° internal angles between adjacent panels will be secured. Other shaped prisms will be apparent to those skilled in the art.

What is claimed is:

1. A method for constructing right hexagonal prism structures, comprising the steps of:

constructing three rectangular sections, each rectangular section including a pair of parallel end pieces, each of said end pieces having two side edges and a preselected, uniform height and width, and a pair of rods interconnecting said end pieces and separating said end pieces by a distance equal to the width of the end pieces multiplied by the square root of three, and including the step of staggering said pair of rods of each of said sections along the height of said end pieces with respect to the rods of the other two sections;

coaxially stacking said three rectangular sections so that said two side edges of each end piece each abut a side edge of an adjacent end piece to define sides of a right hexagonal prism, resulting in the sections being rotated 60° with respect to one another around a common axis, and such that the staggered interconnecting rods of each section clear the rods of the other two sections; and connecting together adjacent end pieces.

2. The method according to claim 1, further including the step of installing additional rods between said end pieces of each section after said rectangular sections are stacked.

3. The method according to claim 1, further including the step of providing a rectangular frame for each of said end pieces.

4. The method according to claim 1, further including the step of providing a rectangular panel for each of said end pieces.

5. The method according to claim 1, further including the step of providing a rectangular panel having a frame affixed to its edges for each of said end pieces.

6. The method according to claim 1, connecting means to said side edges of said end pieces for use in the step of connecting together adjacent end pieces.

7. The method according to claim 6, wherein the step of affixing connecting means to side edges of the end pieces is carried out before the step of stacking the rectangular sections.

8. The method according to claim 6, further including the step of providing a strip of angle iron for each connecting means.

9. The method according to claim 6, further including the step of providing a strip of 90° angle iron for each connecting means, wherein the affixing step includes the step of affixing each strip of angle iron to one side edge of each end piece such that each such strip has a flange extending perpendicularly to and outwardly from said end piece, and wherein the connecting step includes the steps of providing a triangular strip and mounting said triangular strip between said outwardly extending flanges of the strips of angle iron on adjacent end pieces.

10. The method according to claim 6, further including the step of providing a strip of 60° angle iron for each connecting means, wherein the affixing step includes the step of affixing each strip of angle iron to one side edge of each piece such that each such strip has a flange extending inwardly of and at a 60° angle to the respective end piece, and wherein the connecting step includes the step of connecting together said inwardly extending flanges of the strips of adjacent end pieces.

11. The method according to claim 10, further including the step of affixing strips having a triangular cross section with the 60° angle portion of each said strip of 60° angle iron.

12. The method according to claim 1, further including the step of closing an end of the hexagonal structure.

13. A method for constructing a multi-celled structure having hexagonal cells, comprising the steps of:
constructing three rectangular sections, each section having two end pieces, each piece having two side edges, a width and a height, and each section having a length equal to said width multiplied by the square root of three;
stacking said three sections so that each side edge of each end piece abuts a side edge of an adjacent end piece, so that said end pieces define sides of a right hexagonal prism, resulting in the sections being rotated 60° with respect to one another around an axis;
connecting adjacent end pieces; and
coupling a plurality of the right hexagonal prisms together.

14. An apparatus for constructing hexagonal prism structures, comprising:
three rectangular sections, each section having a pair of parallel end pieces having a preselected, uniform height and width and a pair of side edges and upper and lower edges, and a pair of rods interconnecting said end pieces such that each section has a length equal to the width of the end pieces multiplied by the square root of three, said pair of rods being staggered along the height of each section with respect to the rods of the other two sections;
said rectangular sections being stackable such that each side edge of each end piece abuts a side edge of an adjacent end piece and such that the staggered interconnecting rods of each section are nested to clear the rods of the other two sections, resulting in the sections being rotated 60° with respect to one another around an axis; and
connecting means affixed to each side of each end piece for connecting adjacent end pieces when said sections are stacked as aforesaid, said connecting means comprising strips of 90° angle iron, each strip including a flange extending perpendicularly to and outwardly of the end piece to which it is affixed and at a 60° angle to the flange of the adjacent strip when said sections are stacked as aforesaid, and a triangular strip affixed between said outwardly extending flanges of said 90° strips;
such that when the rectangular sections are so stacked and adjacent end pieces are connected, said end pieces define sides of a right hexagonal prism and one of said upper and lower end edges of said end pieces define a hexagon in a plane.

15. An apparatus for constructing hexagonal structures, comprising:
three rectangular sections, each section having a pair of parallel end pieces having a preselected, uniform height and width and a pair of side edges and a pair of end edges, and a pair of rods interconnecting said end pieces such that each section has a length equal to the width of the end pieces multiplied by the square root of three, said pair of rods being staggered along the height of each section with respect to the rods of the other two sections;
said rectangular sections being stackable such that each side edge of each end piece abuts a side edge of an adjacent end piece and such that the staggered interconnecting rods of each section clear the rods of the other two sections, resulting in the sections being rotated 60° with respect to one another around an axis; and
connecting means affixed to each side edge of each end piece for connecting adjacent end pieces when said sections are stacked as aforesaid, said connecting means comprising strips of 60° angle iron, each strip including a flange extending at a 60° angle to and inwardly of the end piece to which it is affixed and being flush with the inwardly extending flange of the adjacent strip when said sections are stacked as aforesaid;
such that when the rectangular sections are so stacked and adjacent end pieces are connected, said end pieces define sides of a right hexagonal prism and one of said upper and lower edges of said end pieces define a hexagon in a plane.

16. A method for constructing a hexagonal surface structure, comprising the steps of:
constructing three rectangular units, each rectangular unit having a pair of parallel end members having a preselected width, and a pair of rods interconnecting the end members and separating them by a distance equal to the width of the end members multiplied by the square root of three, and including the step of staggering the rods of each unit along the height of the end members with respect to the rods of the other two units;
stacking the three rectangular units so that each of the six end members abuts two adjacent end members to define the sides of a hexagon, resulting form the stacked units being rotated 60° with respect to one another around an axis, such that the rods of each unit clear the rods of the other two units; and
connecting together adjacent end members.

* * * * *